US007826085B2

(12) United States Patent
Otsuka

(10) Patent No.: US 7,826,085 B2
(45) Date of Patent: *Nov. 2, 2010

(54) IMAGE-FORMING SYSTEM AND IMAGE-FORMING APPARATUS USED IN THE IMAGE-FORMING SYSTEM

(75) Inventor: Naoki Otsuka, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 339 days.

This patent is subject to a terminal disclaimer.

(21) Appl. No.: 12/010,949

(22) Filed: Jan. 31, 2008

(65) Prior Publication Data

US 2008/0297832 A1  Dec. 4, 2008

Related U.S. Application Data

(63) Continuation of application No. 10/441,036, filed on May 20, 2003, now Pat. No. 7,349,114.

(30) Foreign Application Priority Data

May 21, 2002 (JP) .............................. 2002-145933

(51) Int. Cl.
*G06F 15/00* (2006.01)
*G06K 1/00* (2006.01)
*G03G 15/20* (2006.01)
*G03G 21/20* (2006.01)
*G06F 3/00* (2006.01)

(52) U.S. Cl. .................... 358/1.15; 358/1.13; 358/1.14; 399/70; 399/94; 710/10

(58) Field of Classification Search ....... 358/1.13–1.15; 395/113, 114; 399/70, 94; 710/10
See application file for complete search history.

(56) References Cited

U.S. PATENT DOCUMENTS

| 6,943,905 | B2 * | 9/2005 | Ferlitsch ..................... 358/1.13 |
| 7,038,801 | B2 * | 5/2006 | Kurozasa et al. ........... 358/1.15 |
| 7,064,854 | B2 * | 6/2006 | Idehara ...................... 358/1.15 |
| 7,100,169 | B2 * | 8/2006 | Carney et al. ............... 719/321 |
| 7,106,468 | B2 * | 9/2006 | Jinbo et al. ................. 358/1.15 |
| 7,113,299 | B2 * | 9/2006 | Suzuki et al. .............. 358/1.15 |

(Continued)

FOREIGN PATENT DOCUMENTS

JP   A-07-117316   5/1995

(Continued)

*Primary Examiner*—Edward L Coles
*Assistant Examiner*—Satwant K Singh
(74) *Attorney, Agent, or Firm*—Oliff & Berridge, PLC

(57) ABSTRACT

An image-forming system includes an image-forming apparatus, and a terminal device capable of communicating with the image-forming apparatus. The terminal device comprises a signal-transmitting unit. The image-forming apparatus comprises an image-forming unit; a signal-receiving unit; a first storage unit for storing a starting condition of a preparing action for image formation in the image-forming unit; a first determining unit for determining whether the starting condition is satisfied at the time the signal-receiving unit receives the signal from the terminal device; and an instruction unit for providing an instruction to start the preparing action in the image-forming unit when the first determining unit determines that the starting condition is satisfied.

12 Claims, 7 Drawing Sheets

U.S. PATENT DOCUMENTS

| | | | |
|---|---|---|---|
| 7,349,114 B2 * | 3/2008 | Otsuka | 358/1.15 |
| 2002/0032005 A1 | 3/2002 | Yoshida | |
| 2006/0053481 A1 * | 3/2006 | Olsen et al. | 726/3 |

FOREIGN PATENT DOCUMENTS

| | | |
|---|---|---|
| JP | A-07-129026 | 5/1995 |
| JP | A-10-171613 | 6/1998 |
| JP | A-2000-141831 | 5/2000 |
| JP | A-2001-100968 | 4/2001 |
| JP | A-2002-094531 | 3/2002 |
| JP | A-2002-094848 | 3/2002 |

* cited by examiner

IMAGE-FORMING SYSTEM AND IMAGE-FORMING APPARATUS USED IN THE IMAGE-FORMING SYSTEM This is a Continuation of application Ser. No. 10/441,036 filed May 20, 2003, which in turn claims the benefit of Japanese Patent Application No. JP-A-2002-145933 filed May 21, 2002. The disclosure of the prior applications are hereby incorporated by reference herein in their entirety.

BACKGROUND

The present invention relates to an image-forming system and an image-forming apparatus included in the image-forming system, and more particularly, concerns an image-forming system that needs an preparing action for image formation in an image-forming apparatus, and an image-forming apparatus included in the image-forming system.

An image-forming system, which includes an image-forming apparatus for forming an image on an image-forming medium and a terminal device capable of communicating with the image-forming apparatus, is known. Some of the image-forming apparatus in the image-forming system need a warm-up operation when forming an image on the image-forming medium, such as warming a heat fuser to a specific temperature and above for fixing ink on the image-forming medium by energizing a heater of the heat fuser in the case of laser printers, or melting hot-melt ink by applying heat of an energized heater in the case of inkjet printers.

In such image-forming apparatus, the energization to the heater is made on the basis of a predetermined energizing condition. More specifically, after the image-forming apparatus have received image data from a terminal device such as a computer, a power-saving mode, in which the energization to the heater is stopped, is cancelled to start the energization to the heater. When a certain time has passed after the completion of image formation, the power-saving mode is started again.

However, a certain period of time is required after the start of the energization to the heater until the image-forming apparatus enter an image-formation ready state. Therefore, if the heater-energization is started after the reception of image data, the image-forming apparatus cannot promptly start image formation. On the other hand, it is also possible to constantly hold the image-forming apparatus in an image-formation ready state by continuously or intermittently energizing the heater; however, this may increase power consumption excessively.

SUMMARY

An image-forming system according to an aspect of the invention includes an image-forming apparatus for forming an image on an image-forming medium, and a terminal device capable of communicating with the image-forming apparatus. The terminal device includes a signal-transmitting unit, which transmits a signal to the image-forming apparatus. The image-forming apparatus includes: an image-forming unit; a signal-receiving unit, which receives the signal from the terminal device; a first storage unit for storing a starting condition of a preparing action for image formation in the image-forming unit; a first determining unit for determining whether the starting condition of a preparing action stored in the first storage unit is satisfied at the time the signal-receiving unit receives the signal from the terminal device; and an instruction unit for providing an instruction to start the preparing action for image formation in the image-forming unit when the first determining unit determines that the starting condition of the preparing action is satisfied.

With such arrangements, since the preparing action for image formation in the image-forming unit is started before the image-forming apparatus receives image data, the time after the image-forming apparatus has received the image data until the image formation is started can be reduced. This reduces the waiting time for the user from the image-formation trigger action to the completion of the image formation. Also, since there is no need to continuously or intermittently perform the preparing action for image formation, excess power consumption can be prevented. Further, since the image-forming apparatus does not unconditionally start the preparing action upon reception of the signal from the terminal device, but it is determined in the image-forming apparatus whether the preparing action should be started, the preparing action is not started in a image-forming apparatus requiring no preparing action so as to realize further power-saving.

In the present specification, any preparing actions required for image formation in the image-forming unit are allowed. The preparing action may be one or more. The specific preparing actions depend on the structure of the image-forming apparatus. For example, the preparing actions include energization to a heater for heating a heat fuser, energization to a heater for melting hot-melt ink, ink-flushing for eliminating clogging in the nozzle, and search for the head of the image-forming medium. In the specification, the image data broadly includes data used for image formation such as printing and laser-beam exposure. The terminal device may not transmit image data to the image-forming apparatus. For example, the terminal device may transmit only an image-formation command to the image-forming apparatus.

According to another aspect of the invention, there is provided an image-forming system including an image-forming apparatus for forming an image on an image-forming medium and a terminal device capable of communicating with the image-forming apparatus. The terminal device includes a signal-transmitting unit, which transmits a signal to the image-forming apparatus. The image-forming apparatus includes: an image-forming unit; a signal-receiving unit, which receives the signal from the terminal device; a first storage unit for storing a stopping condition of a preparing action for image formation in the image-forming unit; a second storage unit for storing a changing condition for temporarily changing the stopping condition of a preparing action stored in the first storage unit; a first determining unit for determining whether the changing condition stored in the second storage unit is satisfied at the time the signal-receiving unit receives the signal from the terminal device; and a stopping-condition changing unit for temporarily changing the stopping condition of a preparing action stored in the first storage unit when the first determining unit determines that the changing condition is satisfied.

With such arrangements, the stopping condition of the preparing action for image formation in the image-forming unit is temporarily changed before the image-forming apparatus receives image data. The change in the stopping condition of the preparing action allows the reduction of the time after the image-forming apparatus has received the image data until the image formation is started. This reduces the waiting time for the user from the image-formation trigger action to the completion of the image formation. Also, since there is no need to continuously or intermittently perform the preparing action for image formation, excess power consumption can be prevented. Further, since the image-forming apparatus does not unconditionally make a temporary change in the stopping condition of the preparing action upon reception of the signal from the terminal device, but it is determined in the image-forming apparatus whether the stopping condition of the preparing action should be temporarily changed, the preparing action is not started in a image-forming apparatus requiring no preparing action so as to realize further power-saving.

BRIEF DESCRIPTION OF THE DRAWINGS

Other and further objects, features and advantages of the invention will appear more fully from the following description taken in connection with the accompanying drawings in which.

DETAILED DESCRIPTION OF PREFERRED EMBODIMENTS

Figure 1:
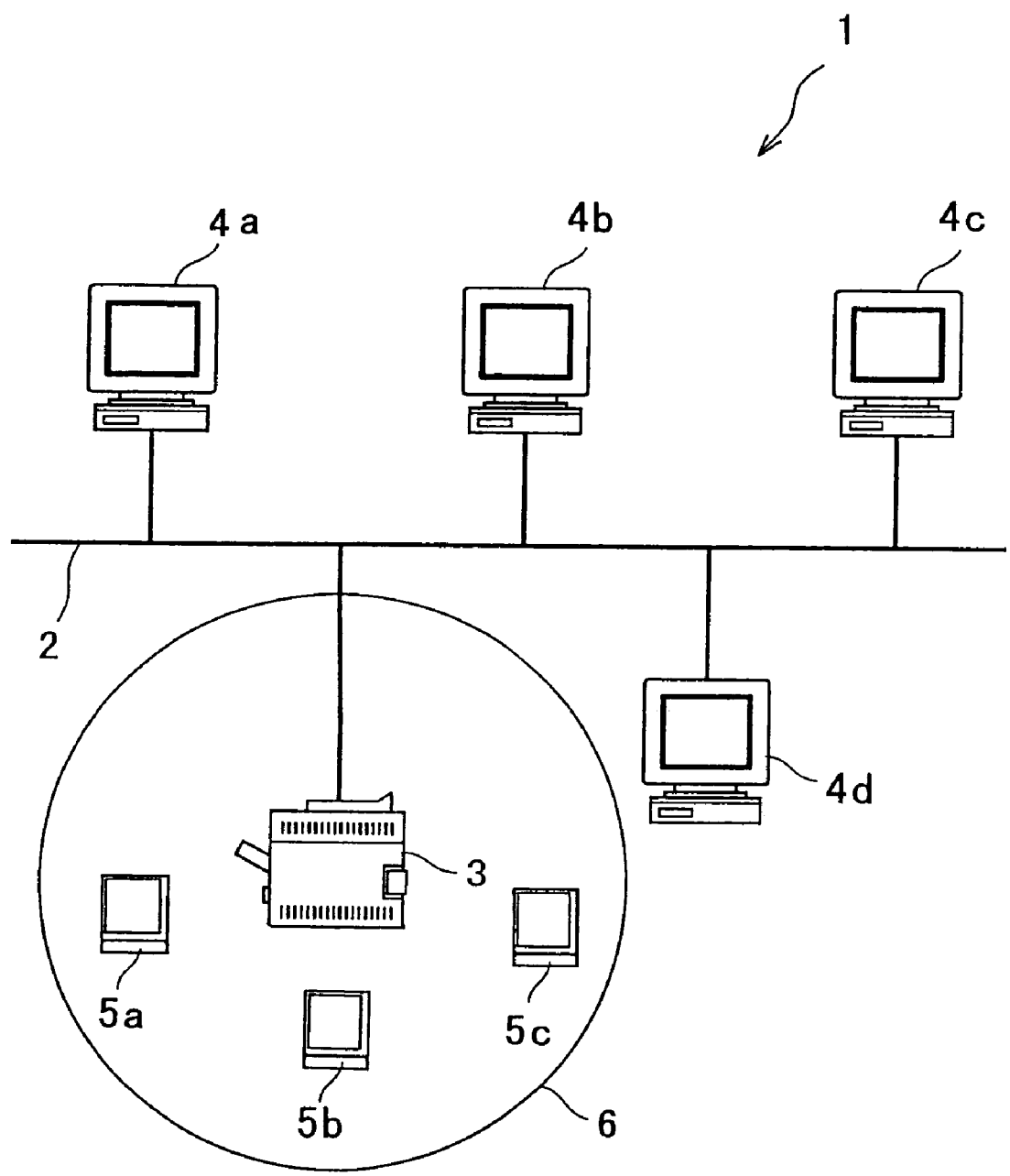
FIG. 1 is a schematic diagram of a printing system according to first and second embodiments of the present invention.

FIG. 1 shows a rough arrangement of a printing system according to an embodiment of the present invention. A printing system 1 of FIG. 1 includes a multifunction peripheral (MFP) 3 acting as an image forming apparatus. The MFP 3 includes an Ethernet interface 18 and a Bluetooth communication module 19 (both see FIG. 2). Four personal computers (hereinafter, abbreviated as PCs) 4a, 4b, 4c, and 4d, and three personal digital assistances (PDAs) 5a, 5b, and 5c are disposed around the MFP 3. The PCs 4a, 4b, 4c, and 4d each include an Ethernet interface. On the other hand, the PDA 5a, 5b, and 5c each include a built in Bluetooth communication module.

As shown in FIG. 1, the MFP 3 and the PCs 4a, 4b, 4c, and 4d are connected together through their own Ethernet interfaces and a LAN cable 2 to configure a star local area network (LAN). The Ethernet communication employs a carrier sense multiple access with collision detection (CSMA/CD) for access control.

A universal plug and play (UPnP) communication, that is a communication protocol using the Ethernet as a network infrastructure, is made between the MFP 3 and the PC 4a. The UPnP is a technical specification for connecting various equipment including home computers, peripherals, audiovisual (AV) equipment, telephone equipment, and household electrical appliances through networks to provide functionality mutually.

On the other hand, when all of the PDAs 5a, 5b, and 5c are in a Bluetooth wireless communication area or piconet area 6 around the MFP 3, the MFP 3 and the PDAs 5a, 5b, and 5c are connected by radio through their respective Bluetooth communication modules, thus configuring a piconet with the MFP 3 as a master and the PDAs 5a, 5b, and 5c as slaves. The Bluetooth wireless communication uses a bandwidth of 2.4 GHz. The piconet area is within about 10 meters to 100 meters radius from the master, the size depending on the class of the transmission output.

In the printing system 1 shown in FIG. 1, the MFP 3 has a laser printer engine built-in, thus printing an image on paper by an electrophotographic system. A modification may be made in which the MFP 3 includes an inkjet printer engine. The PCs 4a, 4b, 4c, and 4d provide the MFP 3 with print data through the LAN cable 2. The PDAs 5a, 5b, and 5c provide the MFP 3 with print data by the Bluetooth wireless communication.

First Embodiment

Figure 2:
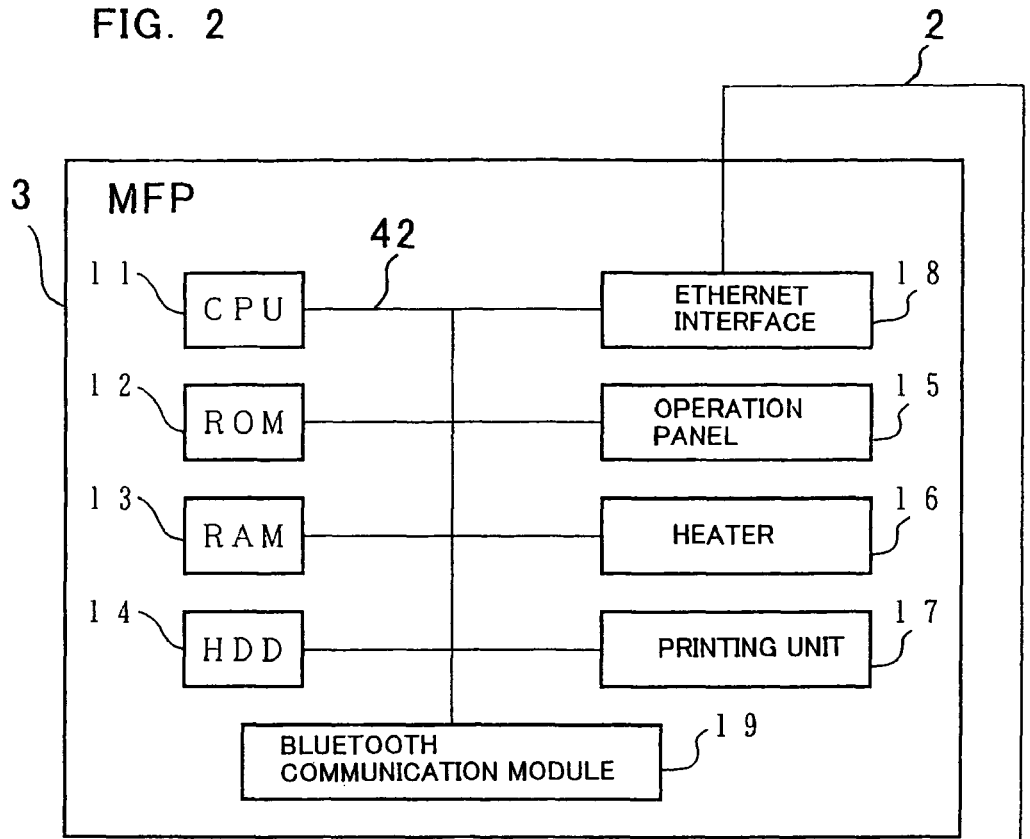
FIG. 2 is a block diagram of the printing system according to the first embodiment of the invention.
Figure 2:
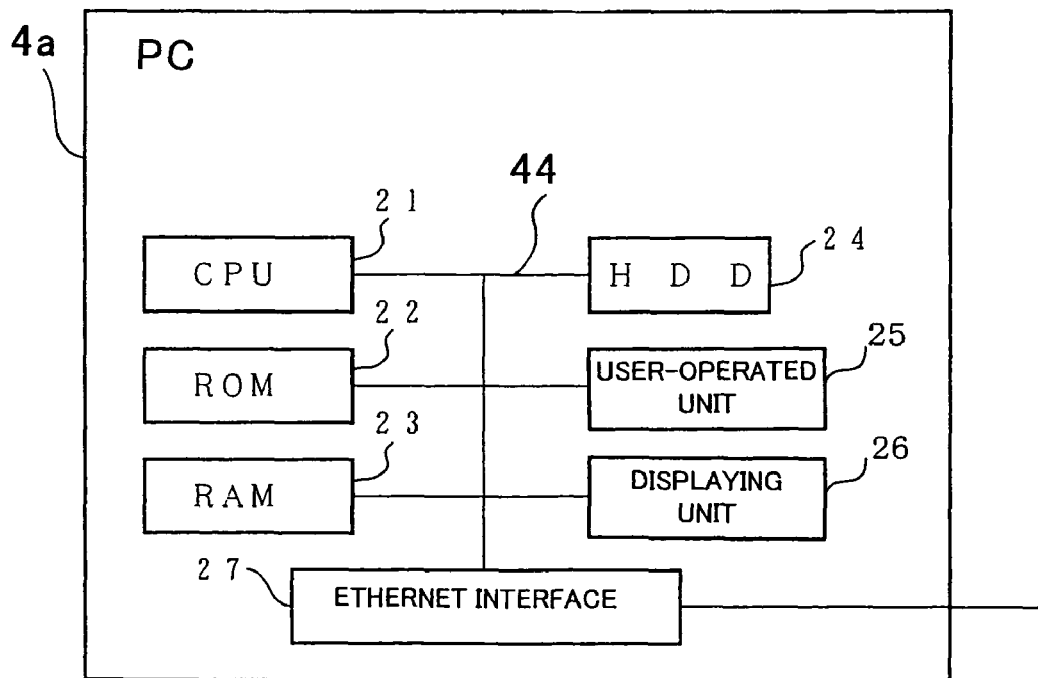

FIG. 2 is a block diagram of a printing system according to a first embodiment of the invention. The printing system of this embodiment includes the MFP 3 and the four PCs 4a, 4b, 4c, and 4d connected by a LAN. Although FIG. 2 shows only the PC 4a for the sake of simplicity, the four PCs 4a, 4b, 4c, and 4d have the same structure, so that the MFP 3 is connected to any of the PCs 4a, 4b, 4c, and 4d similarly for communication.

The PC 4a acting as a terminal device includes a central processing unit (CPU) 21, a read-only memory (ROM) 22, a random access memory (RAM) 13, a hard disk drive (HDD) 24, a user-operated unit 25, a displaying unit 26, and an Ethernet interface 27. They are connected together through a system bus 44.

The ROM 22 constitutes part of a main storage space used by the CPU 21. The ROM 22 stores a system program for controlling the CPU 21.

The RAM 23 constitutes part of the main storage space used by the CPU 21, together with the ROM 22. In the storage space of the RAM 23, a plurality of areas including a working area is defined.

The CPU 21 reads a program stored in the ROM 22 or the HDD 24 for loading it into the RAM 23, and executes the program.

The HDD 24 stores various software, such as a word processor, a mailer, and a Web browser, and data produced by various software. The HDD 24 stores an Internet protocol address (IP address) unique to the PC 4a.

The user-operated unit 25 is connected to the system bus 44 through an input/output interface (not shown), being used for the user to perform input operation for the PC 4a. In the embodiment, the user-operated unit 25 includes a keyboard and a mouse. A modification may be made in which the user-operated unit 25 is a touch panel adhered to the displaying surface of the displaying unit 26, or alternatively, includes both of them. The user uses the user-operated unit 25 when generating print data, selecting a printer, and when triggering printing.

The displaying unit 26 is connected to the system bus 44 through an input/output interface (not shown), including a display such as a liquid crystal display and a plasma display. The displaying unit 26 is used to display data generated by various software and to display a print setup window on the MFP 3.

The Ethernet interface 27 connects the PC 4a with other devices such as the MFP 3 and the PC 4b through the LAN cable 2, being connected to a system bus 42 through an input/output interface (not shown). The Ethernet interface 27 stores a unique media access control address (MAC address).

In the embodiment, the CPU 21 issues various commands based on the UPnP. The commands issued includes a Discovery command, a Device-Description query command, and a Service-Description query command. The Discovery command requires the return of the MAC address or the IP address of the receiving device The Device-Description query command requires a list of functions of the receiving device such as a print function and a display function. The Service-Description query command requires a list of actions related to the function of the device and state variables associated with the actions. The commands includes the MAC addresses or the IP addresses that are identification information about the PCs 4a, 4b, 4c, and 4d which transmit the commands.

The issued command is transmitted from the Ethernet interface 27 to each device on the LAN. When the MFP 3 receives the Discovery command, the MFP 3 returns the MAC address or the IP address that is the identification information about the MFP 3. When the MFP 3 received the Device-Description query command, the MFP 3 returns Device description to the PC 4a together with the MAC address or the IP address that is the identification information about the MFP 3. When the MFP 3 received the Service-Description query command, the MFP 3 returns Service Description to the PC 4a together with the MAC address or the IP address. The returned MAC address or IP address, Device Description, and Service Description are stored in the HDD 24.

The MFP 3 includes a CPU 11, a ROM 12, a RAM 13, an HDD 14, an operation panel 15, a heater 16, a printing unit 17, an Ethernet interface 18, and a Bluetooth communication module 19. They are connected together through the system bus 42.

The ROM 12 constitutes part of a main storage space used by the CPU 11. The ROM 12 partly includes a user-rewritable electronically erasable and programmable read-only memory (EEPROM). The ROM 12 stores a system program for controlling the CPU 11, software for printing, software for the energization to the heater 16, and so on. The software for the energization of the heater 16 includes data on a condition (energization start condition) for determining energization start timing, a condition (energization stop condition) for determining energization stop timing, and a condition during the energization to the heater 16 such as an applied current value. Here, the energization start condition includes the temperature around the heater 16 being no more than the predefined temperature, and the energization stop condition include waiting time from the nearest print end time to energization stop time.

The RAM 13 constitutes part of the main storage space used by the CPU 11, together with the ROM 12. In the storage space of the RAM 13, a plurality of areas such as a working area is defined.

The working area stores working data which is temporarily necessary, an intermediate file and so on. The working area is used for executing the system program, the software for printing, software for energizing the heater 16, and so on.

The CPU 11 reads the program stored in the ROM 12 for loading it into the RAM 13, and executes the program.

The HDD 14 stores the IP address unique to the MFP 3. The HDD 14 stores print data transferred from the PCs 4a, 4b, 4c, and 4d, and also a list of the PCs 4a, 4b, 4c, and 4d that have transmitted the Device-Description query command to the MFP 3. The list stored includes the MAC addresses or the IP addresses that are the identification information about the PCs 4a, 4b, 4c, and 4d. The list is used to determine whether the PCs 4a, 4b, 4c, and 4d that have transmitted the Discovery command to the MFP 3 are PCs 4a, 4b, 4c, and 4d that have transmitted no Discovery command in the past (that have transmitted the Discovery command for the first time) to the MFP 3.

The operation panel 15 includes an information display and a user-operated input device, being connected to the system bus 42 through an input/output interface (not shown). The display is used to display the information on various functions of the MFP 3. The display may be a liquid crystal display or a plasma display. The input device is used to input the information on the various functions of the MFP 3. In the embodiment, the input device is a plurality of pushbutton switches. A modification may be made in which the input device is a touch panel adhered to the surface of the display, or alternatively, includes both of them.

The heater 16 is used to heat a heat fuser to a specific temperature and above, the heat fuser for heat-fixing a toner image formed on the basis of the print data onto paper that is a image-forming medium. The heater 16 is connected to the system bus 42 through an input/output interface (not shown). In a modification, the printing unit 17 of the MFP 3 performs inkjet printing, the heater 16 is used to melt hot-melt ink.

The printing unit 17 is connected to the system bus 42 through an input/output interface (not shown). The printing unit 17 is a laser printer engine, printing characters or graphics on paper in color or monochrome by an electrophotographic system.

The Ethernet interface 18 connects the MFP 3 with other devices such as the PCs 4a, 4b, 4c, and 4d through the LAN cable 2, being connected to the system bus 42 through an input/output interface (not shown). The Ethernet interface 18 stores a unique MAC address.

The Bluetooth communication module 19 is connected to the system bus 42 through an input/output interface (not shown), performing Bluetooth short-range wireless communication with a Bluetooth communication module of a terminal device (for example, with a Bluetooth communication module 38 of the PDA 5a). The Bluetooth communication module 19 allows data communication at a maximum data transfer rate of 1 Mbps in the range of about 10 meters in radius in a wireless frequency band of 2.4 GHz by frequency hopping (FH) spread spectrum modulation. The Bluetooth communication module 19 stores a unique Bluetooth address (BD address). The BD address is 12-digit character string in which the digits are either of 0 to 9 and A to F.

In the embodiment, the CPU 11 determines whether the MFP 3 has received the Discovery command sent from either of the PCs 4a, 4b, 4c, and 4d through the Ethernet interface 18. When it is determined that it has been received, the CPU 11 returns the MAC address or the IP address of the MFP 3. At that time, unless the heater 16 is not being energized, the CPU 11 determines whether the Discovery command is a command from the PCs 4a, 4b, 4c, and 4d that are not listed in the HDD 14. When it is determines that the received Discovery command is a command from new PCs 4a, 4b, 4c, and 4d (that have not transmitted the Discovery command to the MFP 3 in the past), the CPU 11 further determines whether the energization to the heater 16 needs to be started on the basis of whether the ambient temperature of the heater 16 satisfies the energization start condition for determining energization start timing stored in the ROM 12. When the energization to the heater 16 is necessary, the CPU 11 provides an instruction to start the energization to the heater 16 before the start of printing in the printing unit 17. When energization stop condition is satisfied after the completion of the printing, the CPU 11 provides an instruction to stop the energization to the heater 16.

The CPU 11 also determines whether the MFP 3 has received the Device-Description query command or the Service-Description query command sent from either of the PCs 4a, 4b, 4c, and 4d through the Ethernet interface 18. When it is determined that it has been received, the CPU 11 returns the Device Description or the Service Description, together with the MAC address or the IP address of the MFP 3.

The energization stop procedure for the heater 16 in the printing system of the present embodiment will be now described. The following energization-stop procedure for the heater 16 is performed in a line different from a printing procedure, which will be described later, on the basis of the predefined energization stop condition.

It is periodically determined during the energization to the heater 16 whether the energization to the heater 16 should be stopped. When it is determined that the energization to the heater 16 should be stopped, the CPU 11 makes an instruction to do so, so that the energization to the heater 16 is stopped. Thus, the MFP 3 enters a power-saving mode or sleep mode). Determination as to whether the energization to the heater 16 should be stopped is made depending on whether a fixed waiting time has passed from a nearest print end time. It is after the Discovery command from the new PC or the print data from the PC 4a has been received that the energization to the heater 16 is started, as will be described later.

The energization to the heater 16 is stopped also when the ambient temperature of the heater 16 sensed by a temperature sensor (not shown) has exceeded a maximum temperature. In this case, the energization to the heater 16 is automatically restarted when the ambient temperature of the heater 16 is decreased to some extent.

Figure 3:
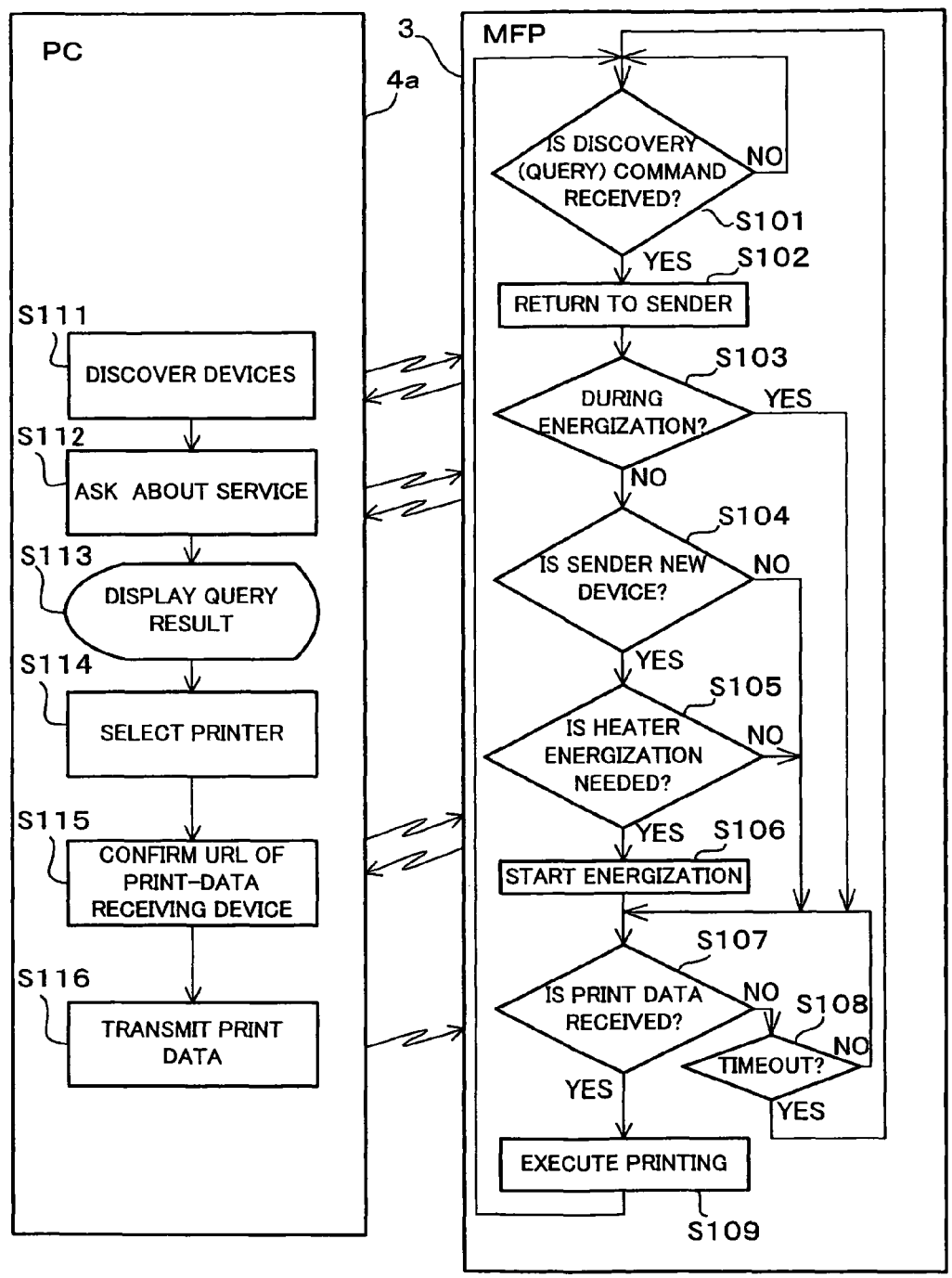
FIG. 3 is a flowchart of a printing process in the printing system of FIG. 2.
Figure 4:
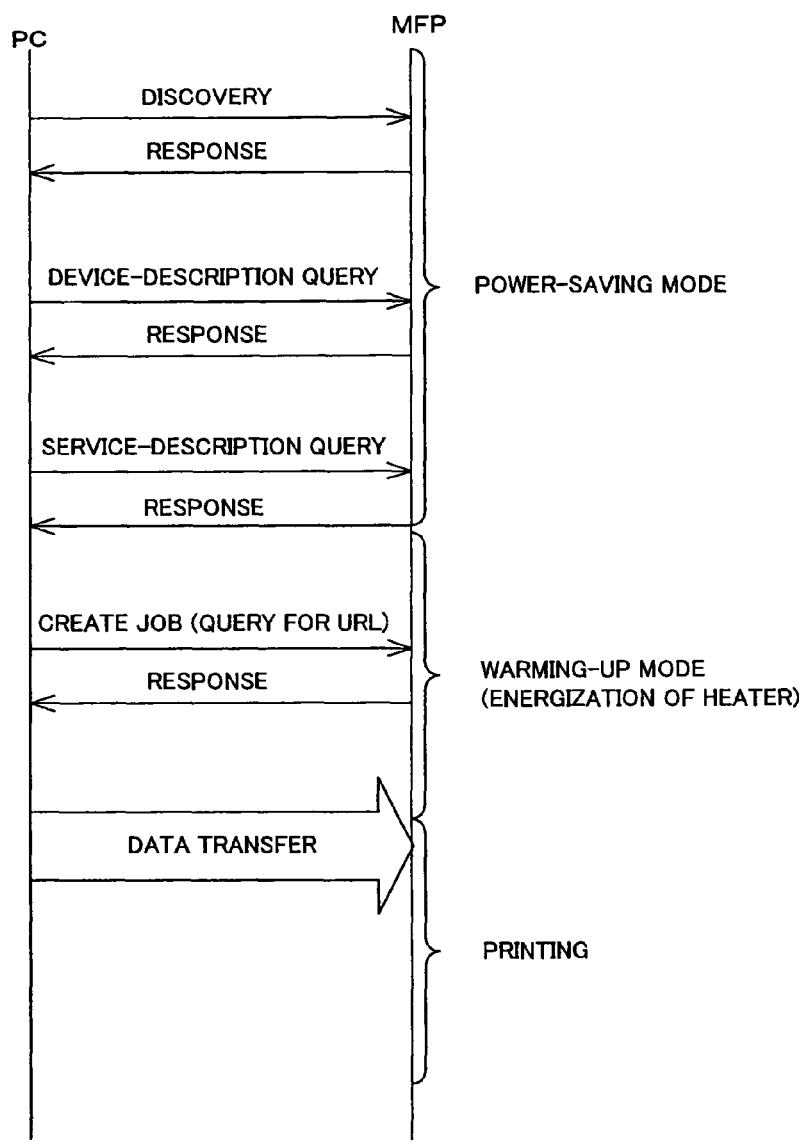
FIG. 4 is an operational sequence diagram of the printing process in the printing system of FIG. 2.

Referring to FIGS. 3 and 4, the printing procedure in the printing system of the embodiment will next be described.

In the printing procedure of FIG. 3, first in step 111, the PC 4a broadcasts the Discovery command to discover active devices connected to the LAN.

On the other hand, in step 101, the CPU 11 of the MFP 3 repeatedly determines whether the Discovery command broadcasted from the PC 4a has been received by the Ethernet interface 18. When it is determined that it has been received (YES in step 101), in step 102, the MFP 3 which has received the Discovery command from the PC 4a sends the MAC address or the IP address of its own to the sender PC 4a.

In step 112, the PC 4a asks a service to the MFP 3 that has returned the MAC address or the IP address in step 102. More specifically, first, it is determined whether the MFP 3 has a print function by the transmission of the UPnP Device-Description query command. Thereafter, the action for the printing in the MFP 3 is confirmed by the UPnP Service-Description query command. After the reception of the Device-Description query command and the Service-Description query command, in step 102, the MFP 3 transmits the Device Description and the Service Description to the PC 4a. In this way, the PC 4a can collect information necessary for transmitting print data to the MFP 3.

In step 103, the CPU 11 determines whether the heater 16 is being energized at present. When the energization is being performed (YES in step 103), the process moves to step 107. On the other hand, when the energization is not being performed (NO in step 103), in step 104, the CPU 11 of the MFP 3 determines whether the Discovery-command sender is a new PC. The determination is made by comparing the MAC address or the IP address that indicates the sender of a newly transmitted Discovery command with the MAC addresses or the IP addresses listed in the HDD 14.

Consequently, when it is determined that the Discovery-command sender is not a new PC 4a (NO in step 104), the process moves to step 107. On the other hand, when it is determined that the Discovery-command sender is the new PC 4a (YES in step 104), the process moves to step 105. In step 104, the identification information, the MAC address or the IP address, about the new PC 4a that has sent the Discovery command is stored in the HDD 14 of the MFP 3.

In step 105, it is determined whether the energization to the heater 16 is necessary. More specifically, it is determined that the energization is needed when the temperature around the heater 16 is no more than a predefined temperature on the basis of the energization start condition of the heater 16 stored in the ROM 12. When it has been determined that the energization is necessary (YES in step 105), in step 106, the energization to the heater 16 is started by the instruction of the CPU 11. When it has been determined that the energization is not necessary (NO in step 105), the process moves to step 107.

In step 113, the information on the device having the print function, obtained by the query in step 112, is displayed on the displaying unit 26 as query results. In step 114, the user performs a predefined operation to the user-operated unit 25 with reference to the query results displayed on the displaying unit 26, thereby selecting a device to which print data is to be sent. In this case, a description will be continued, assuming that the MFP 3 has been selected.

In step 115, the Uniform Resource Locator (URL) of the print-data receiving device is confirmed for the selected MFP 3 by the PC 4a. More specifically, a query command for the URL of a printing device by the Create Job, one of the actions obtained by the UPnP Service-Description query command, is issued by the CPU 21 of the PC 4a, and the command is sent from the PC 4a to the MFP 3 selected in step 114. Upon the reception of the command, the MFP 3 sends its own URL to the PC 4a. Subsequently, in step 116, the print data is transmitted from the PC 4a to the MFP 3. In other words, the query command for the URL of a printing device by the Create Job, sent by the PC 4a, serves as a transmission start signal indicating that the print data is sent to the MFP 3. The transmission of the print data is made by the Ethernet communication in which the MAC address or the IP address of the MFP 3 is the forwarding address.

In step 107, it is determined by the MFP 3 whether the print data transmitted from the PC 4a has been received. When it is determined that the print data has been received (YES in step 107), the process moves to step 109, wherein the printing unit 17 makes a printing on the basis of the print data. In case the energization to the heater 16 is required before the printing, specifically, in case the energization to the heater 16 has not been performed and the ambient temperature around the heater 16 is below a predetermined temperature, the energization to the heater 16 is started. After the completion of the printing, the process returns to step 101. When it is determined that the print data has not been received (NO in step 107), in step 108, it is determined whether the time elapsed from the energization start time has exceeded a predefined period of time. When it is determined that it has not exceeded (NO in step 108), the process returns to step 107 wherein the reception of the print data is confirmed again. When it is determined that it has exceeded (YES in step 108), the process returns to step 101.

As can be understood by the description, when the Discovery-command sender is the new PC 4a, the energization to the heater 16 has already been started or the energization to the heater 16 has become unnecessary (for example, the periphery of the heater 16 is sufficiently high in temperature) during the printing in the MFP 3. Accordingly, upon the reception of the print data in step 107, the MFP 3 allows the printing unit 17 to perform printing in a relatively short time. Therefore, the print-waiting time for the user is remarkably decreased than before. Also, since there is no need to energize the heater 16 continuously or intermittently until the MFP 3 receives the Discovery command, power consumption by the heater 16 can be reduced. Further, since the MFP 3 does not unconditionally start the preparing action upon reception of the Discovery command or Device-Description query command from the PC 4a, but it is determined in the MFP 3 whether the energization to the heater 16 should be started, the energization to the heater 16 is not started in a MFP 3 requiring no energization to the heater 16. Therefore, further power-saving can be realized.

As described above, in the embodiment, only when the Discovery-command sender is a new PC, the energization to the heater 16 is started. This is because it is presumed that a PC that has sent a Discovery command to the MFP 3 in the past has a high probability of already being transmitted print data to the MFP 3 or another printer selected. In other words, when it is presumed that the Discovery-command sender has a low probability of transmitting print data, advance energization to the heater 16 is not allowed, thus increasing the probability of reducing power consumption.

According to the embodiment, it is ascertained whether the energization to the heater 16 is necessary before the start of energization, and only when necessary, the energization to the heater 16 is performed, thus further reducing power consumption.

According to the embodiment, since the PC 4a acting as a terminal device sends the UPnP Discovery-command, the MAC address or the IP address of a device having a printing function on the LAN can be effectively detected, so that print data can be transmitted to a desired device.

According to the embodiment, since the PC 4a sends the UPnP Device Description query command and the UPnP Service Description query command, a device having a printing function on the LAN and its action can be effectively detected.

According to the embodiment, since a versatile UPnP communication is used for the communication between the MFP 3 and the PC 4a, the development of the printing system 1 is facilitated.

In the embodiment, although the PC 4a sends the Discovery command, a modification may be made in which the MFP 3 sends the Discovery command. In this case, the HDD 14 of the MFP 3 stores the list of the PCs 4a, 4b, 4c, and 4d detected by MFP 3 at the Discovery command. Also the list includes the MAC address or the IP address that is the identification information about the PCs 4a, 4b, 4c, and 4d. The list stored in the HDD 14 is used to determine whether the PCs 4a, 4b, 4c, and 4d detected by the MFP 3 at the Discovery command are PCs 4a, 4b, 4c, and 4d that have not been detected in the past (newly detected).

In the embodiment, step 104 may be skipped. In other words, even if the Discovery-command sender is not a new PC, the energization may be started. Also, step 105 may be skipped. In other words, when the Discovery-command sender is a new PC, the energization to the heater 16 may be started irrespective of the temperature around the heater 16. Also, both of step 104 and step 105 may be skipped.

In the first embodiment, the MFP 3 may start the processes following step 103 after receiving the Device-Description query command or the Service-Description query command. Alternatively, the MFP 3 may start the processes following step 105 after receiving the query command for the URL of the printing device by the Create Job.

Here, although the energization start timing for the heater 16 is later when the processes following step 103 are started after the reception of the Device-Description query command than that of the above embodiment, unnecessary energization to the heater 16 is reduced. This is because print data is more possibly transmitted to the MFP 3 when the Device-Description query command is received from the PC 4a than when the Discovery command is received from the PC 4a.

Although the energization start timing for the heater 16 is more delayed when the processes following step 103 are started after the reception of the Service-Description query command than when the processes are started after the reception of the Device-Description query command, useless energization to the heater 16 is more reduced. This is because print data is more possibly transmitted to the MFP 3 when the Service-Description query command is received from the PC 4a than when the Device-Description query command is received from the PC 4a.

Although the energization start timing for the heater 16 is more delayed when the processes following step 105 are started after the reception of the query command for the URL of the printing device by the Create Job than when the processes following step 103 are started after the reception of the Service-Description query command, useless energization to the heater 16 is more reduced. This is because print data is transmitted from the PC 4a almost without fail when the query command for the URL of the printing device by the Create Job is received from the PC 4a.

In the present embodiment, since the energization start condition for determining energization start timing is stored in the EEPROM included in a part of the ROM 12, the user can change the energization start condition.

Second Embodiment

Figure 5:
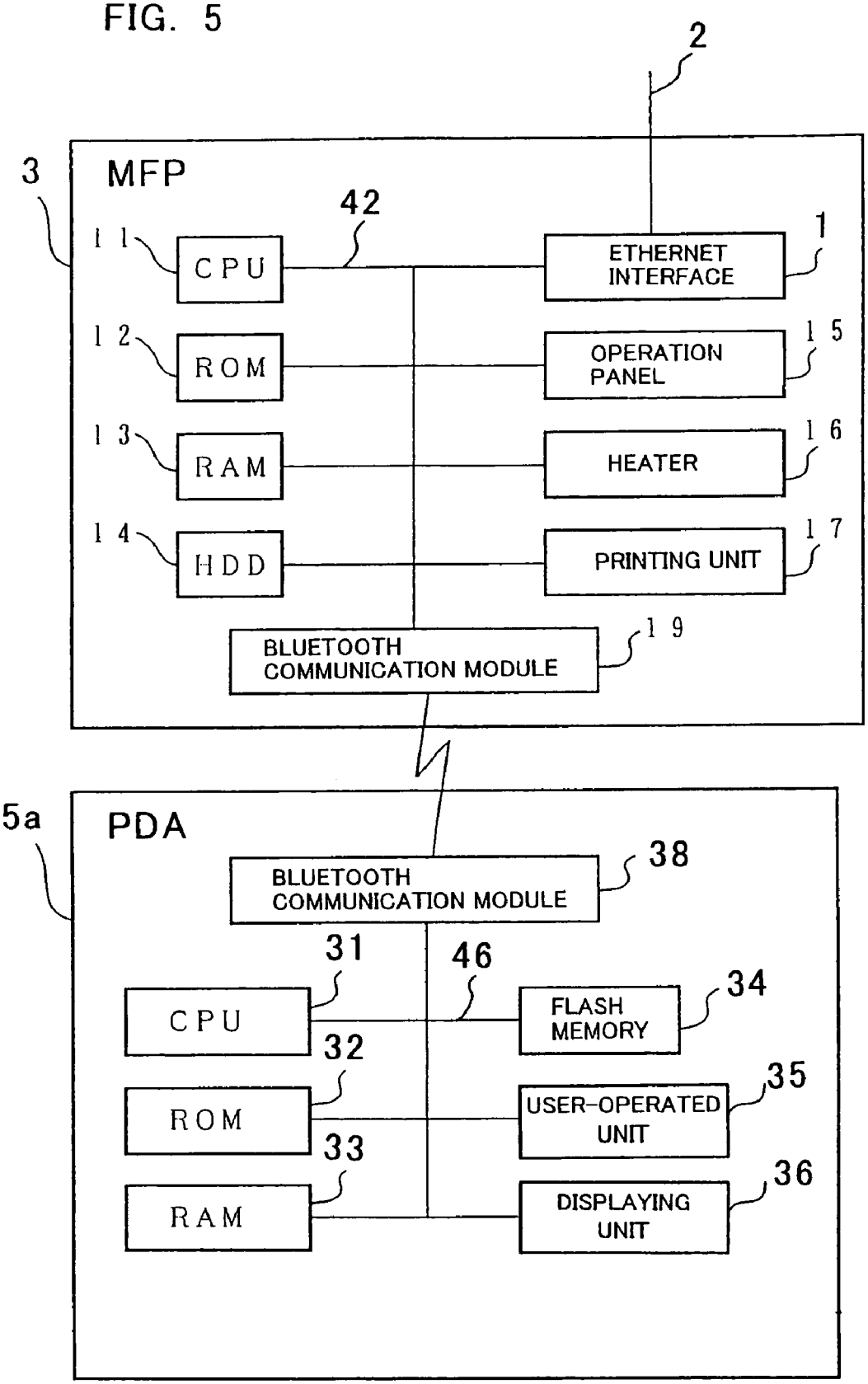
FIG. 5 is a block diagram of the printing system according to the second embodiment of the invention.

FIG. 5 is a block diagram of a printing system according to a second embodiment of the invention. The printing system of the embodiment includes the MFP 3 and the three PDAs 5a, 5b, and 5c connected to it by Bluetooth wireless system. While FIG. 5 illustrates only the PDA 5a for the sake of simplicity, the three PDAs 5a, 5b, and 5c have the same structure, so that the MFP 3 is connected to any of the PDAs 5a, 5b, and 5c similarly for communication.

The PDA 5a acting as a terminal device includes a CPU 31, a ROM 32, a RAM 33, a flash memory 34, a user-operated unit 35, a displaying unit 36, and a Bluetooth communication module 38. They are connected together through a system bus 46.

The ROM 32 constitutes part of a main storage space used by the CPU 31. The ROM 32 stores a system program for controlling the CPU 31 and various software such as a word processor, a mailer, and a Web browser.

The RAM 33 constitutes part of the main storage space used by the CPU 31, together with the ROM 32. In the storage space of the RAM 33, a plurality of areas including a working area is defined.

The CPU 31 reads a program stored in the ROM 32 or the flash memory 34 for loading it into the RAM 33, and executes the program.

The flash memory 34 stores various software that are additionally registered by the user and data generated by the user with software.

The user-operated unit 35 is connected to the system bus 46 through an input/output interface (not shown), being used for the user to do input to the PDA 5a. In the embodiment, the user-operated unit 35 includes a touch panel adhered to the surface of the displaying unit 36 and a pushbutton switch. The user uses the user-operated unit 35 when creating print data, selecting a printer, and when triggering printing.

The displaying unit 36 is connected to the system bus 46 through an input/output interface (not shown), including a display such as a liquid crystal display and a plasma display.

The displaying unit 36 is used to display data generated by the various software and to display a print setting screen on the MFP 3.

The Bluetooth communication module 38 connects the PDA 5a with other devices (the MFP 3 in this case) acting as the master of the Bluetooth piconet, being connected to the system bus 46 through an input/output interface (not shown). The Bluetooth communication module 38 stores a unique Bluetooth address.

Since the components in the MFP 3 are the same as those of the first embodiment, a description thereof will be omitted here.

The HDD 14 of the MFP 3 stores print data transferred from the PDAs 5a, 5b, and 5c and also a list of the PDAs 5a, 5b, and 5c detected by the Inquiry of the MFP 3. The list includes the BD addresses that are the identification information about the PDAs 5a, 5b, and 5c. The list stored in the HDD 14 is used to determine whether the PDAs 5a, 5b, and 5c detected by the Inquiry of the MFP 3 are newly detected PDAs 5a, 5b, and 5c that have not been detected by the MFP 3 in the past.

Further, the EEPROM included in a part of the ROM 12 of the MFP 3 stores a condition (changing condition) for temporarily changing the stop condition of energization to the heater 16. As described below, the changing condition in the present embodiment is that "the device newly detected by the MFP can transmit print data".

In the embodiment, the CPU 11 issues various commands based on the Bluetooth specification. The commands includes an Inquiry command that requires the return of the BD address that is the identification information about the receiving device, and a Service Discovery command that inquires about the service of the device. The commands include the BD address that is the identification information about the MFP 3 which transmits the commands.

The issued commands are transmitted from the Bluetooth communication module 19 to the slaves of the piconet of the MFP 3, namely PDAs 5a, 5b and 5c. The PDA 5a that has received the Inquiry returns the BD address that is the identification information about the PDA 5a. At that time, the CPU 11 determines whether the BD address is a BD address not listed in the HDD 14. When it is determined that it is a new BD address that has not returned to the Inquiry sent by the MFP 3 in the past, the CPU 11 further sends the Service Discovery command to a new PDA 5a. Upon reception of the Service Discovery command, together with the BD address that is the identification information about the PDA 5a, the PDA 5a returns information on the profile (a communication protocol for each product, e.g., a Serial Port profile that indicates that a serial communication is available, a Fax profile that indicates that a Fax communication is available, a Basic Printing profile, and a Hardcopy Cable Replacement profile) of the PDA 5a to the MFP 3. The returned BD address and information on the profile are stored in the HDD 14.

The CPU 11 of the MFP 3 determines whether the profiles of the newly stored information include a profile for a print service (in other words, whether or not a device that has returned to the Inquiry transmits print data to the MFP 3). When the profile for the print service is included, the energization stop condition is temporarily changed so that the energization to the heater 16 is not stopped for some time. Thereafter, the CPU 11 determines whether the energization to the heater 16 needs to be started on the basis of the changed energization stop condition. When the energization to the heater 16 is necessary, the CPU 11 provides an instruction to start the energization to the heater 16 before the start of printing in the printing unit 17. After the completion of the printing, the CPU 11 undoes the changed energization stop condition, and provides an instruction to stop the energization to the heater 16 when the energization stop condition is satisfied.

Figure 6:
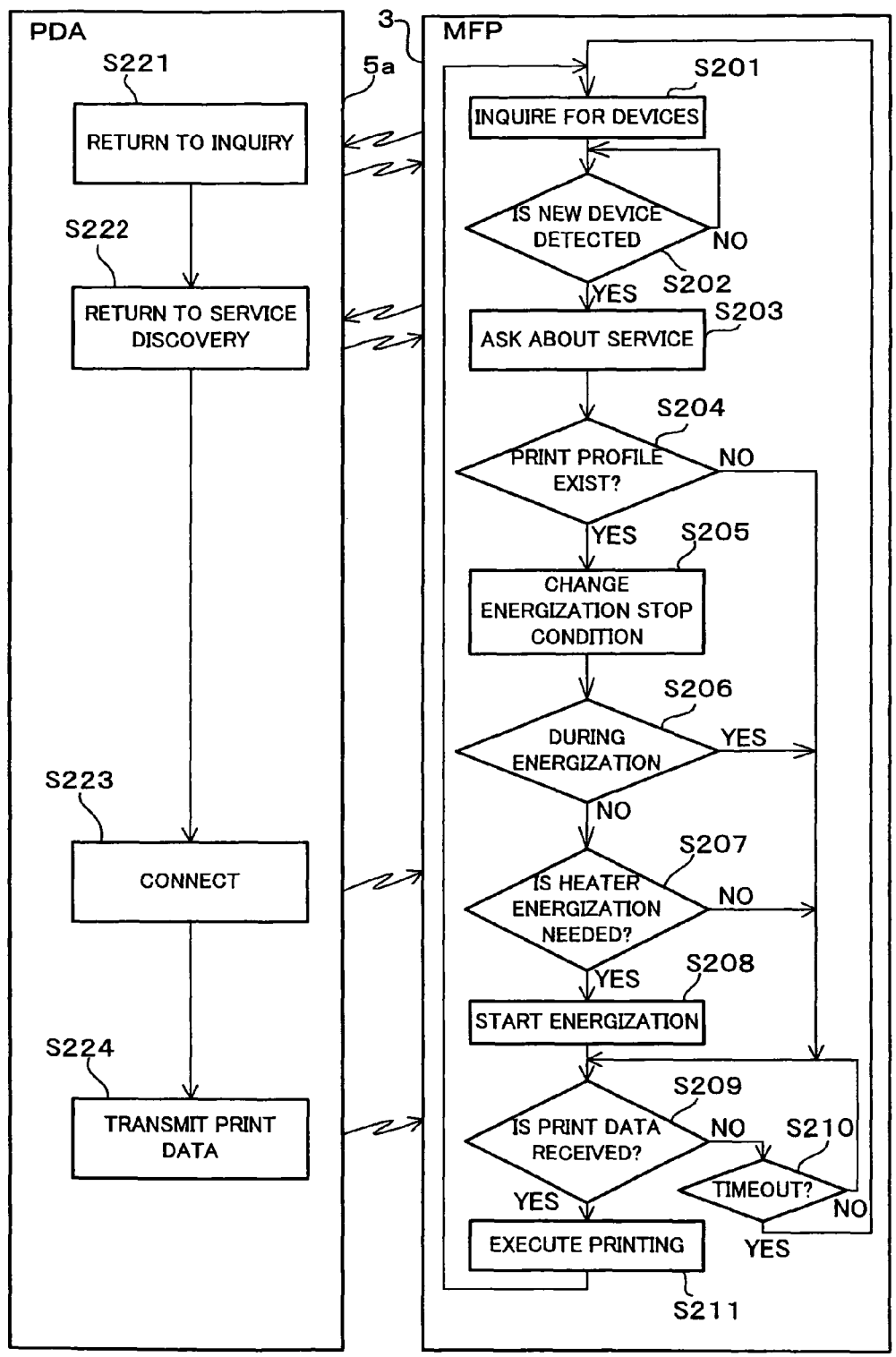
FIG. 6 is a flowchart of the printing process in the printing system of FIG. 5.
Figure 7:
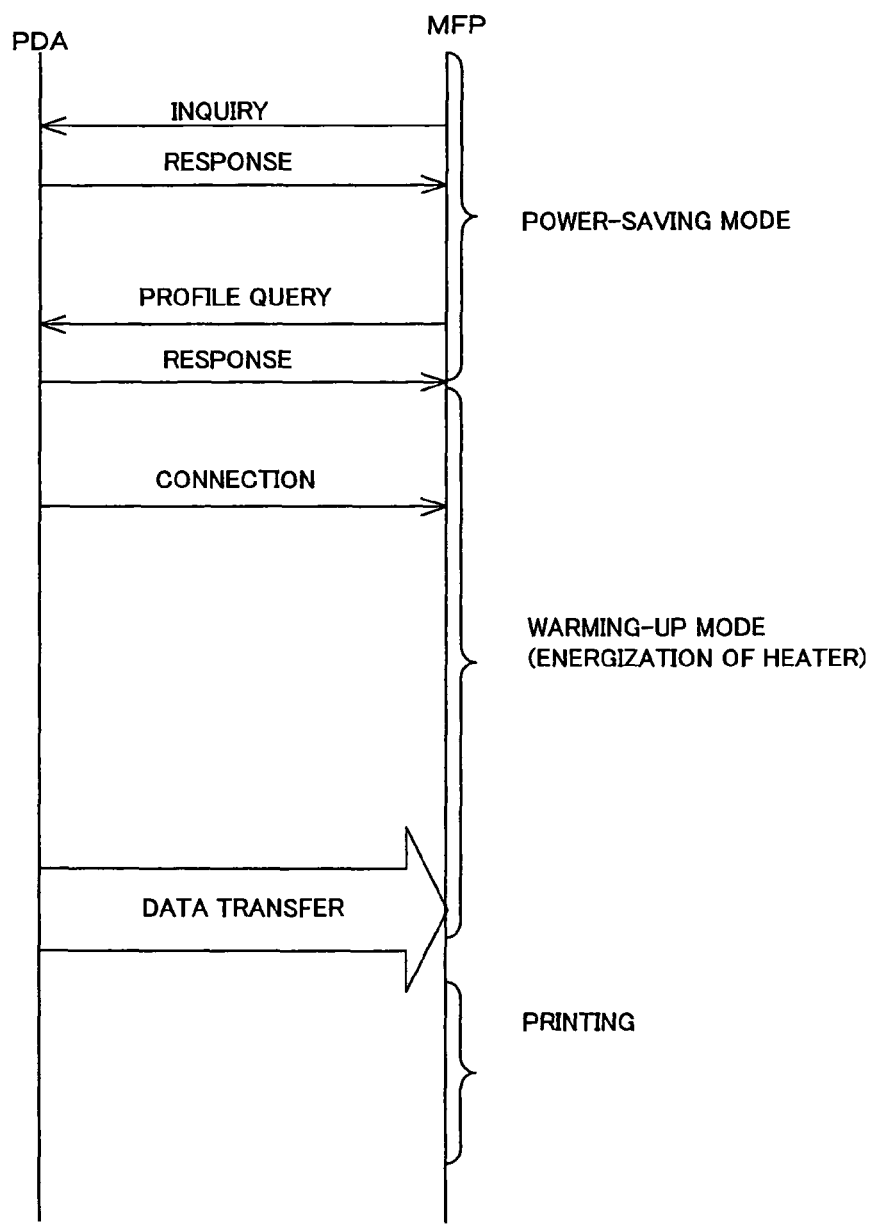
FIG. 7 is an operational sequence diagram of the printing process in the printing system of FIG. 5.

Referring to FIGS. 6 and 7, a printing procedure in the printing system of the embodiment will be described. Since the energization stop procedure for the heater 16 in the printing system of the embodiment is the same as that of the first embodiment, a description thereof will be omitted here.

In the printing procedure of FIG. 6, first, in step 201, the MFP 3 broadcasts the Inquiry to inquire for devices able to communicate with the MFP 3 by using the Bluetooth protocol. On the other hand, in step 221, upon receiving the Inquiry from the MFP 3, the PDA 5a returns its own BD address to the MFP 3.

In step 202, the CPU 11 of the MFP 3 repeatedly determines whether the return to the Inquiry has been received by the Bluetooth communication module 19. When it is determined that it has been received (YES in step 202), the CPU 11 of the MFP 3 repeatedly determines whether the device detected by the Inquiry is a new Bluetooth terminal, that is, whether the sender of the return to the Inquiry is a new PDA 5a. The determination is made by comparing the BD address that indicates the sender of the return to the Inquiry with the BD addresses listed in the HDD 14. When a new PDA 5a is detected (YES in step 202), the BD address of the PDA 5a is stored in the HDD 14 of the MFP 3.

Subsequently, in step 203, the MFP 3 sends a Bluetooth Service Discovery command to the PDA 5a that has returned the BD address in response to the Inquiry, thereby asking about the service of the PDA 5a. On the other hand, in step 222, upon receiving the Service Discovery command from the MFP 3, the PDA 5a returns information on one or a plurality of profiles of its own to the MFP 3.

In step 204, the MFP 3 determines whether the profile of the newly detected PDA 5a includes a Print profile according to the information on the profile received from the PDA 5a in step 203. When the Print profile is included (YES in step 204), that means the changing condition stored in the ROM 12 is satisfied, and therefore, in step 205, the energization stop condition stored in the ROM 12 is temporarily changed. Here, waiting time from the nearest print end time to energization stop time is increased. On the other hand, when no Print profile is included (NO in step 204), the process moves to step 209. Subsequently, in step 206, the CPU 11 determines whether the heater 16 is being energized at present. When the energization is being performed (YES in step 206), the process moves to step 209. On the other hand, when the energization is not being performed (NO in step 206), the process moves to step 207.

In this state, in step 207, it is determined whether the energization to the heater 16 is necessary on the basis of the changed energization stop condition. More specifically, it is determined that the energization is needed when the time elapsed from the nearest print end time is shorter than a predefined waiting time until the energization stop time for the heater 16 under the changed condition, which is stored in the ROM 12. In this case, the temperature around the heater 16 is compared with a predefined temperature on the basis of the energization start condition for the heater 16, stored in the ROM 12, wherein when the temperature around the heater 16 is lower than the predefined temperature (YES in step 207), the process moves to step 208. In step 208, the energization to the heater 16 is started by the instruction of the CPU 11. When either of the two conditions in step 207 is not satisfied (NO in step 207), the process moves to step 209.

When the user operates a user-operated unit 35 to trigger printing, in step 223, the synchronization between the Bluetooth communication module 19 and the Bluetooth communication module 38 is established to connect the MFP 3 and the PDA 5a together. Subsequently, in step 224, print data is transmitted from the PDA 5a to the MFP 3. The transmission of the print data is performed by the Bluetooth communication with the BD address of the MFP 3 set as a sending address.

In step 209, it is determined by the MFP 3 whether the print data transmitted from the PDA 5a has been received. When it is determined that the print data has been received (YES in step 209), the process moves to step 211, wherein the printing unit 17 makes a printing on the basis of the print data. After the completion of the printing, the process returns to step 201. When the energization to the heater 16 has not been performed before the printing, the energization to the heater 16 is started. When it is determined that no print data has been received (NO in step 209), in step 210, it is determined whether the time elapsed from the energization start time has exceeded a predefined period of time. When it is determined that it has not exceeded (NO in step 210), the process returns to step 209 wherein the reception of the print data is confirmed again. When it is determined that it has exceeded (YES in step 210), the process returns to step 201.

The energization stop condition changed in step 206 is undone in conjunction with the completion of the printing.

As can be understood by the description, when the BD-address sender in response to the Inquiry is the new PDA 5a and the device can transmit print data, the energization to the heater 16 has already been started before the printing in the MFP 3 by temporarily changing the energization stop condition, except the case where the energization to the heater 16 has become unnecessary. Accordingly, upon receiving the print data in step 209, the MFP 3 allows the printing unit 17 to perform printing in a relatively short time. Therefore, the print-waiting time for the user is remarkably decreased than before. Also, since there is no need to energize the heater 16 continuously or intermittently until the MFP 3 receives the Inquiry, power consumption by the heater 16 can be reduced. Further, since the MFP 3 does not unconditionally make a temporary change in the energization stop condition upon reception of information about the BD addresses and the profiles from PDA 5a, but it is determined in the MFP 3 whether the energization stop condition should be temporarily changed, the energization to the heater 16 is not started in the MFP 3 requiring no energization to the heater 16. Therefore, further power-saving can be realized.

As described above, in the embodiment, only when the device that has returned the BD address in response to the Inquiry is a new PDA, the energization stop condition for the heater 16 is changed. This is because it is presumed that a new PDA that has sent no BD address to the Inquiry in the past has a high probability of transmitting print data because it is conceivable that the user has entered the piconet area with the MFP 3 as a master for the purpose of printing. In other words, when it is presumed that the device that has returned the BD address in response to the Inquiry has a low probability of transmitting print data, advance energization to the heater 16 is not allowed, thus increasing the probability of further reducing power consumption.

According to the embodiment, only when the device that has returned the BD address in response to the Inquiry has a profile to send print data, the energization stop condition for the heater 16 is changed. This prevents useless processing in which the energization stop condition for the heater 16 is changed when a device that sends no print data is detected.

After the energization stop condition has been changed, it is determined whether the energization to the heater 16 is necessary, wherein only when necessary, the energization to the heater 16 is performed. Therefore, power consumption can be further reduced. Additionally, because the change in energization stop condition is temporary, it can be prevented that this change increases power consumption of the MFP 3.

According to the embodiment, since the MFP 3 acting as an image-forming apparatus sends the Bluetooth Inquiry, the BD address of the slave unit in the piconet can be effectively detected.

Further, according to the embodiment, since the MFP 3 sends the Bluetooth Service Discovery command, a device that may transmit print data in the piconet can be effectively detected.

Besides, according to the embodiment, since the versatile Bluetooth communication is used for the communication between the MFP 3 and the PDA 5a, the development of the printing system is facilitated.

In the embodiment, although the MFP 3 sends the Inquiry command, a modification may be made in which the PDA 5a sends the Inquiry command. In this case, the HDD 14 stores the list of the PDAs 5a, 5b, and 5c that have transmitted the Service Discovery to the MFP 3. The list stored includes the BD addresses that are the identification information about the PDAs 5a, 5b, and 5c. The list is used to determine whether the PDAs 5a, 5b, and 5c that have sent the Inquiry command to the MFP 3 are PDAs 5a, 5b, and 5c that have sent no Inquiry command in the past that have sent the Inquiry command for the first time.

In the embodiment, step 202 may be skipped. That is to say, even if a device detected in step 201 is not a new device, the energization stop condition may be changed. Also, the comparison between the temperature around the heater 16 and a predefined temperature in step 207 may be omitted wherein it may be determined whether the energization to the heater 16 is necessary only on the basis of the comparison between the time elapsed from the nearest print end time and a predetermined waiting tie after the change. After the connection between the PDA 5a and the MFP 3 has been established in step 223, the energization stop condition may be changed.

In step 206, the energization stop condition may be changed such that the energization to the heater 16 is not stopped until the next printing is performed, in place of increasing the waiting time from the nearest print end time to the energization stop time.

Since the energization stop condition for determining energization stop timing, and changing condition thereof are stored in the EEPROM included in a part of the ROM 12, the user can change these two conditions.

Otherwise, the above-described first and second embodiments can be changed as follows: For example, the first embodiment may be achieved by the Bluetooth communication and the second embodiment may be achieved by the Ethernet communication. In case the first embodiment is achieved by the Bluetooth communication, in step 111 shown in FIG. 3, a PC (or a PDA) broadcasts the Inquiry to devices in a piconet area to which the PC (or the PDA) belongs. The MFP 3 that has received the Inquiry returns the BD address that is the identification information about the MFP 3. In step 112, it is determined whether the MFP 3 has a print function by the transmission of the Service Discovery command from the PC (or the PDA) to the MFP 3. Upon reception of the Service Discovery command, together with the BD address that is the identification information about the MFP 3, the MFP 3 returns information on the profile. A communication system, which has the same advantages as the first embodiment, using the Bluetooth communication in exchange for the Ethernet communication can be established in this manner.

In the second embodiment, although the preparing action for image formation is to energize the heater, it may be another action other than the energization to the heater. For example, it may be energization to a printing mechanism except heaters, a maintenance action before printing, or detection of failures in each component of the device. More specifically, it may be elimination of static electricity or cleaning of a photosensitive drum in the case of laser printers, pre-ejection or flushing, purging, a cleaning or wiping action of an ejecting head, or an alignment of a carriage in the case of inkjet printers. The starting condition of the preparing action, the stopping condition of the preparing action, and the changing condition thereof may include only one condition as in the above-described embodiment, or alternatively, may include a plurality of conditions.

In the embodiments, although the UPnP cable LAN communication and the Bluetooth wireless communication are described as examples of a communication system, every communication systems may be employed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image-forming apparatus capable of communicating with a terminal device which can provide an instruction for image formation to the image-forming apparatus,
   wherein the image-forming apparatus comprises:
   an image-forming unit;
   a signal-transmitting unit, which transmits, to the terminal device, a request signal for requesting the transmission of a signal indicating a function that is available for the terminal device that has received the request signal;
   a signal-receiving unit, which receives the signal that is transmitted by the terminal device as a response to the request signal and that indicates the function that is available for the terminal device;
   a first storage unit for storing a starting condition of a preparing action for image formation in the image-forming unit;
   a first determining unit for determining whether the starting condition of the preparing action stored in the first storage unit is satisfied at the time the signal-receiving unit receives the signal that is transmitted by the terminal device and the signal received indicating a function that is performable by the image-forming apparatus; and
   an instruction unit for providing an instruction to start the preparing action for image formation in the image-forming unit when the first determining unit determines that the starting condition of the preparing action is satisfied.

2. The image-forming apparatus according to claim 1, wherein the signal indicating the function that is available for the terminal device includes information on whether or not it can transmit image data.

3. The image-forming apparatus according to claim 1, wherein the request signal is a signal for requesting the transmission of the information on whether or not it can transmit image data on the basis of a Bluetooth Service Discovery command.

4. The image-forming apparatus according to claim 1, further comprises a heater, wherein the instruction unit provides an instruction to start energization to the heater as the preparing action.

5. An image-forming apparatus capable of communicating with a terminal device which can provide an instruction for image formation to the image-forming apparatus,
   wherein the image-forming apparatus comprises:
   an image-forming unit;
   a signal-receiving unit, which receives either one of two signals including a first query signal to require a function that the image-forming apparatus performs and a second query signal to require necessary information for performing a function that the image-forming apparatus performs, from the terminal device;
   a first storage unit for storing a stopping condition of a preparing action for image formation in the image-forming unit;
   a second storage unit for storing a changing condition for temporarily changing the stopping condition of the preparing action stored in the first storage unit;
   a first determining unit for determining whether the changing condition stored in the second storage unit is satisfied at the time the signal-receiving unit receives the signal that is transmitted by the terminal device; and
   a stopping-condition changing unit for changing the stopping condition of the preparing action stored in the first storage unit when the first determining unit determines that the changing condition is satisfied.

6. The image-forming apparatus according to claim 5, further comprises:
   a third storage unit for storing identification information about the terminal device that has transmitted the signal received by the signal-receiving unit; and
   a second determining unit for determining whether a new signal received by the signal-receiving unit is transmitted from the terminal device whose identification information is stored in the third storage unit on the basis of the identification information stored in the third storage unit, and
   wherein the stopping-condition changing unit changes the stopping condition of the preparing action stored in the first storage unit when the first determining unit determines that the changing condition is satisfied, and the second determining unit determines that the new signal received by the signal-receiving unit is transmitted from another terminal device other than the terminal device whose identification information is stored in the third storage unit.

7. The image-forming apparatus according to claim 5, further comprises a heater, wherein the stopping-condition changing unit changes a stopping condition of energization to the heater as a preparing action.

8. The image-forming apparatus according to claim 5, wherein the signal transmitted by the terminal device is a Bluetooth Service Discovery command.

9. The image-forming apparatus according to claim 5, wherein the second query signal is a query signal to require a destination of data processed for image forming in the image-forming apparatus.

10. The image-forming apparatus according to claim 9, wherein the query signal to require a destination of data processed for image forming is a query command for the URL of a printing device by a UPnP Create Job.

11. The image-forming apparatus according to claim 5, wherein the second query signal is a query command for information on whether or not it can form images.

12. The image-forming apparatus according to claim 5, wherein the first query signal transmitted by the terminal device is a UPnP Device Description query command, and the second query signal transmitted by the terminal device is a UPnP Service Description query command.

* * * * *